Figure 1:
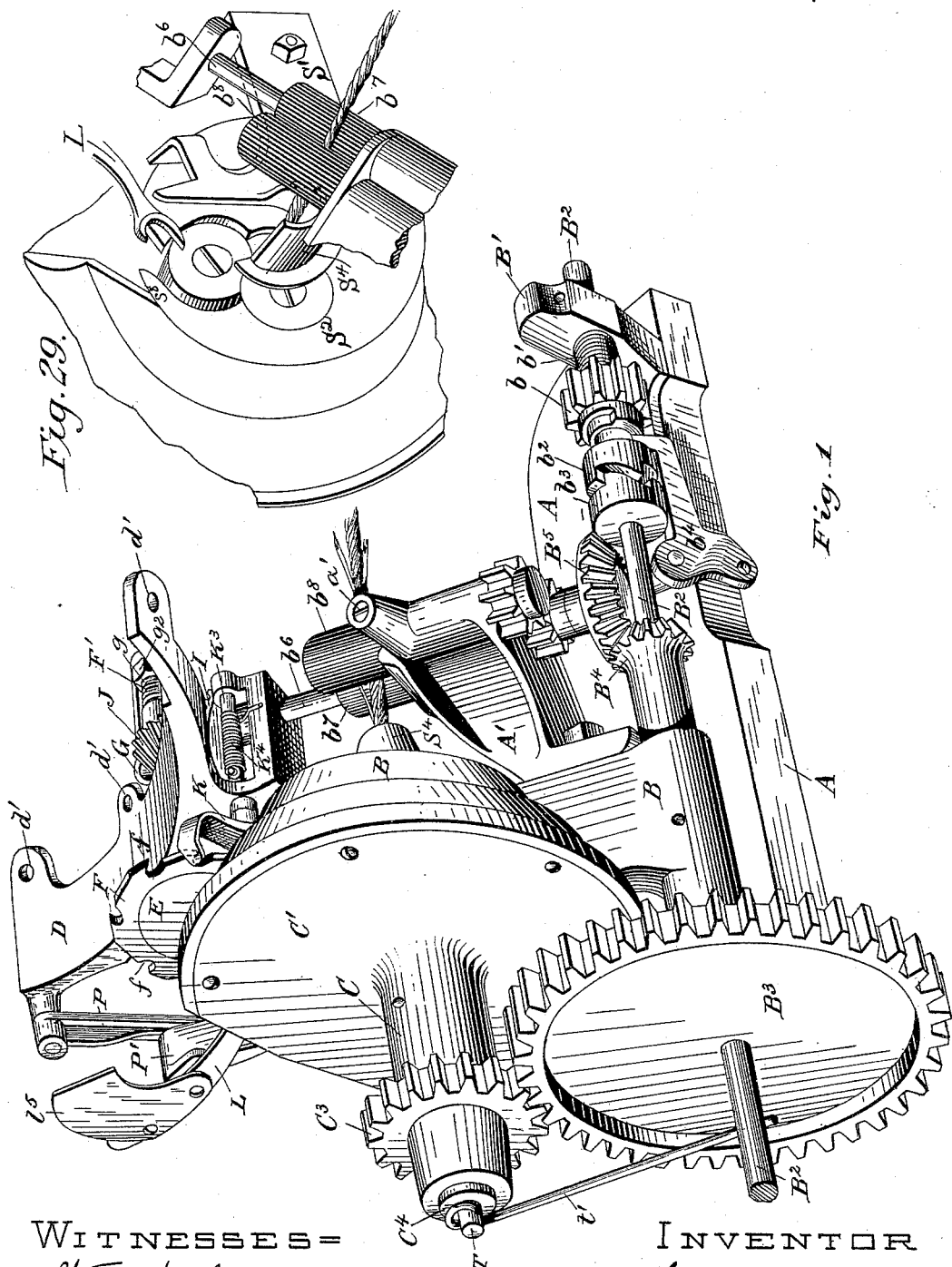

(No Model.)  7 Sheets—Sheet 1.

G. H. HOWE.
BAND TWISTER.

No. 430,650. Patented June 24, 1890.

WITNESSES
Walter W. Lovegrove
C. H. Baker

INVENTOR
George H. Howe
by Hinsdill Parsons
his Attorney.

(No Model.)  7 Sheets—Sheet 2.

G. H. HOWE.
BAND TWISTER.

No. 430,650.  Patented June 24, 1890.

WITNESSES=
Walter W. Lovegrove.
C. H. N. Baker

INVENTOR=
George H. Howe
by Hinsdill Parsons,
his attorney.

(No Model.)

7 Sheets—Sheet 3.

G. H. HOWE.
BAND TWISTER.

No. 430,650.

Patented June 24, 1890.

WITNESSES=
Walter W. Lovegrove.
C. H. N. Baker.

INVENTOR=
George H. Howe
by Hinsdill Parsons
his Attorney.

(No Model.) 7 Sheets—Sheet 4.
G. H. HOWE.
BAND TWISTER.
No. 430,650. Patented June 24, 1890.
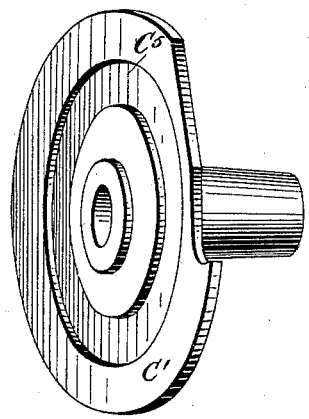
Fig. 18
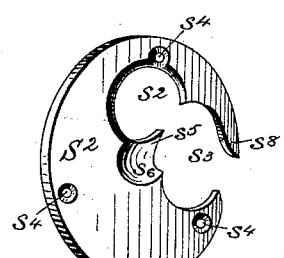
Fig. 19
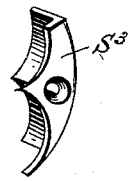
Fig. 20
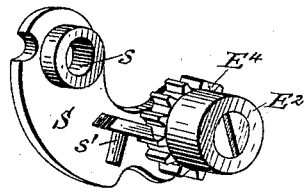
Fig. 22
Fig. 21
Fig. 23
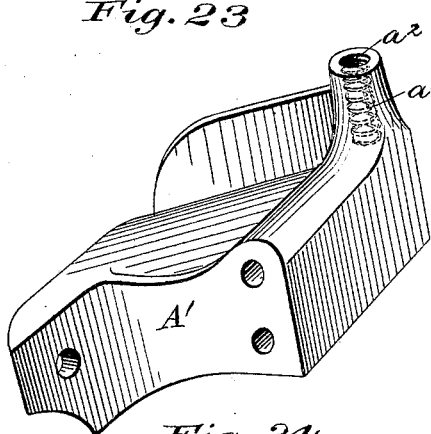
Fig. 24
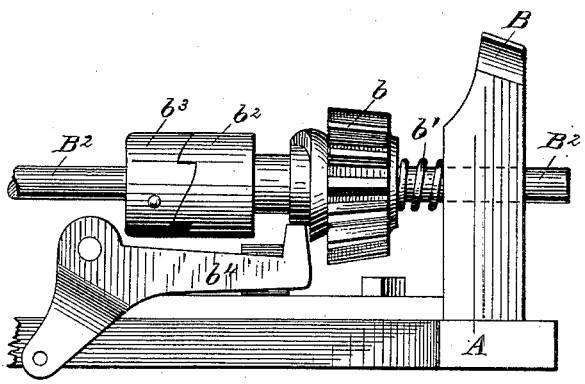
Fig. 25
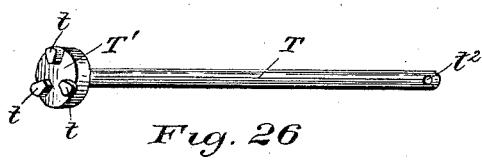
Fig. 26
WITNESSES:
Walter W. Lovegrove.
C. H. Baker
INVENTOR:
George H. Howe
by Hinsdill Parsons
his Attorney (No Model.) 7 Sheets—Sheet 5.
G. H. HOWE.
BAND TWISTER.
No. 430,650. Patented June 24, 1890.
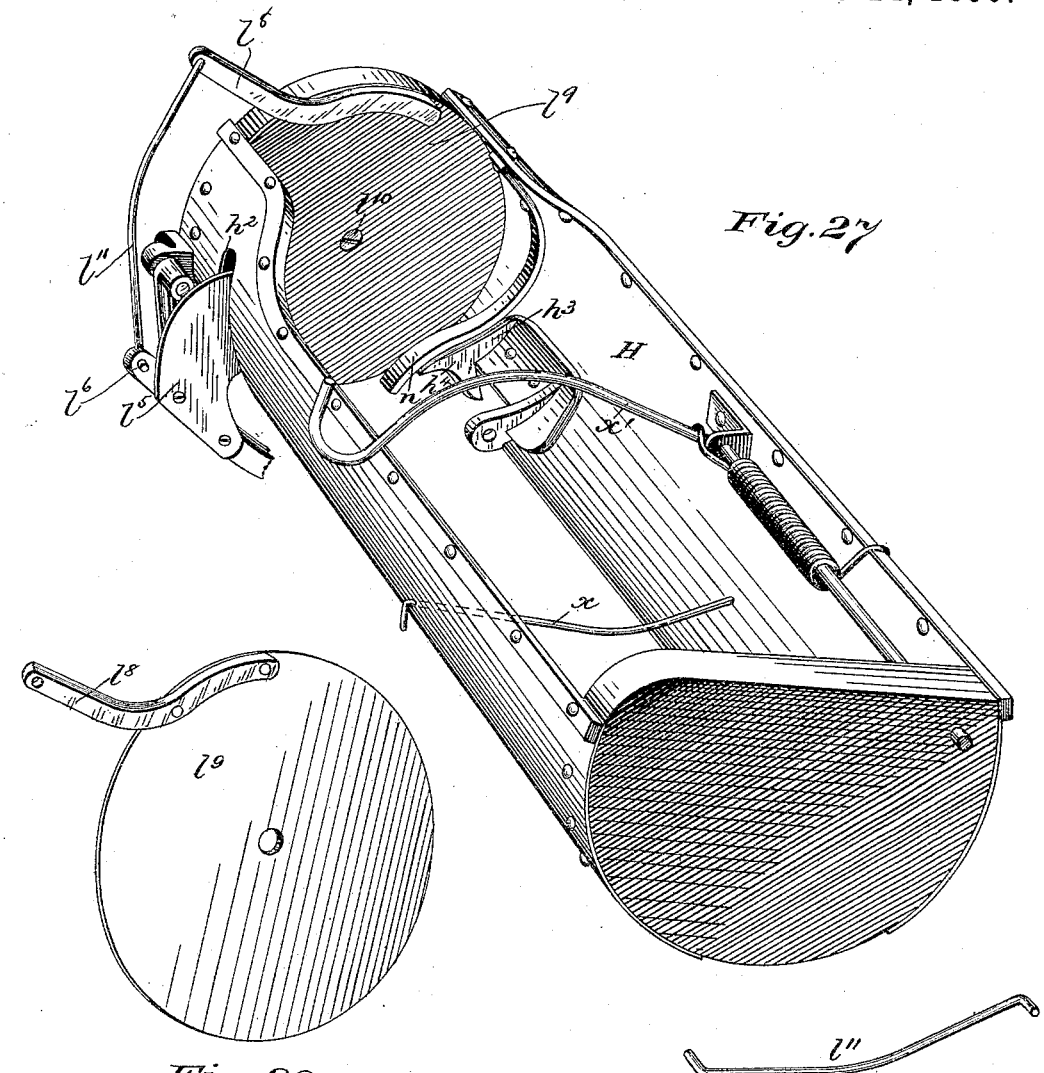
Fig. 27
Fig. 28
Fig. 30
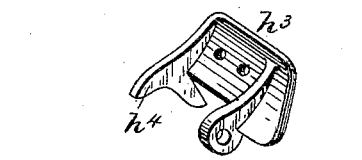
Fig. 31
WITNESSES=
Walter W. Lovegrove
C. H. Baker
INVENTOR=
George H. Howe
by Hinsdill Parsons
his Attorney.

(No Model.) 7 Sheets—Sheet 6.

G. H. HOWE.
BAND TWISTER.

No. 430,650. Patented June 24, 1890.

WITNESSES.
Walter W. Lovegrove
C. C. Schiller Jr.

INVENTOR.
George H. Howe.
By Hundill Parsons
his ATTORNEY.

(No Model.) 7 Sheets—Sheet 7.
G. H. HOWE.
BAND TWISTER.
No. 430,650. Patented June 24, 1890.
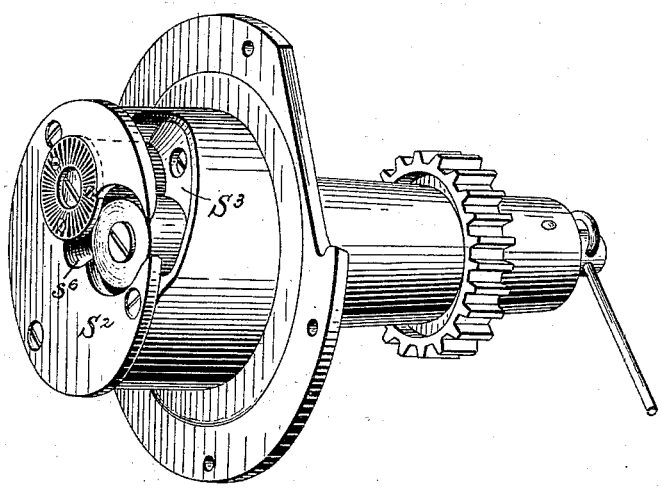
Fig. 34
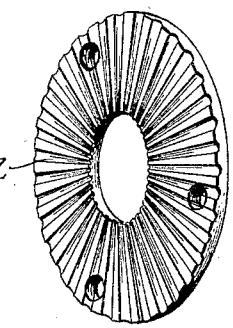
Fig. 33.
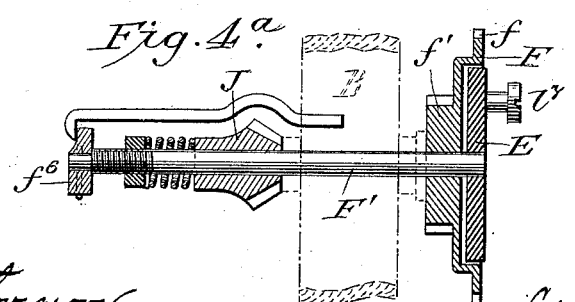
Fig. 4ᵃ
WITNESSES:
Walter W. Lovegrove
C. H. Baker
INVENTOR
George H. Howe,
By Hinsdill Parsons,
his ATTORNEY

UNITED STATES PATENT OFFICE.

GEORGE HUTCHINS HOWE, OF HOOSICK FALLS, NEW YORK.

BAND-TWISTER.

SPECIFICATION forming part of Letters Patent No. 430,650, dated June 24, 1890.

Application filed May 12, 1888. Serial No. 273,751. (No model.)

*To all whom it may concern:*

Be it known that I, GEORGE HUTCHINS HOWE, a citizen of the United States, residing at Hoosick Falls, county of Rensselaer, and State of New York, have invented certain new and useful Improvements in Band-Twisters, of which the following is a full, clear, and exact description, reference being had to the accompanying drawings, forming part of this specification.

My invention relates to band-twisters which are designed to be attached to grain-binding harvesters and, receiving motion therefrom as the machine advances, form from straw or other analogous material the band for binding the bundles of grain. In Patent No. 321,438, granted to me July 7, 1885, I have described a band-forming mechanism, and the twisting apparatus herein described is substantially similar in many respects to that set forth in the aforesaid patent; and my present invention relates more particularly to the mechanism for picking the straws to form the band from the hopper. In order that the band formed may be of a uniform size, it is necessary that the quantity of straw delivered to the twister be always the same, and also that every chance be given the picking mechanism to surely take from the hopper a predetermined quantity of band material. If the picking mechanism operates but once to a certain number of revolutions of the twister, or if only one chance is given the picking mechanism during such certain number of revolutions of the twister to withdraw the desired quantity of band material from the hopper, it will often happen, owing to the straws having become crossed in the hopper or for other obvious reasons, that the picker will fail to withdraw the desired quantity of band material from the hopper, and, on the other hand, should the picker operate more than once to such certain number of revolutions of the twister too much band material might be withdrawn from the hopper. In either case the band formed would not be uniform in size. In order to obviate these difficulties, I provide a picking mechanism, which is given several opportunities to pick the desired quantity of band material from the hopper as the twister is making a certain number of revolutions, and also mechanism which will cause the picker to cease operating when the desired quantity has been withdrawn from the hopper until such quantity has been delivered to the twister, when the picking mechanism will be again set automatically in motion. This mechanism consists of a notched disk revolving transversely to the length of a slot in the bottom of the hopper and a yielding device against which the straw withdrawn from the hopper by the disk is forced, which yielding device arrests the action of the disk until the straw has been carried into the twisting apparatus.

My invention also relates to certain other improvements in the hopper and twisting devices, which will be more fully hereinafter described.

Figure 2:
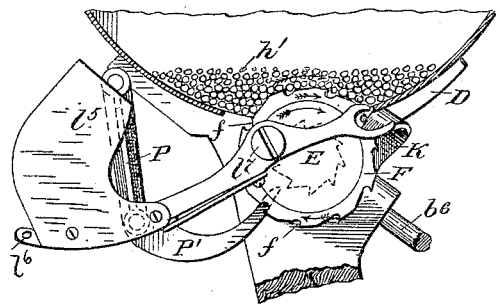
Figure 3:
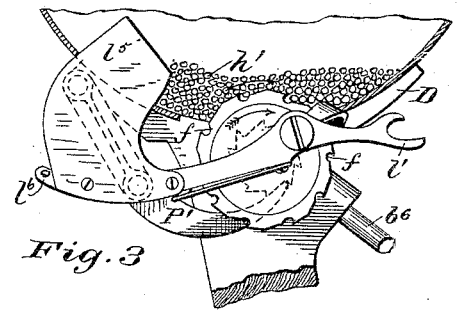
Figure 4:
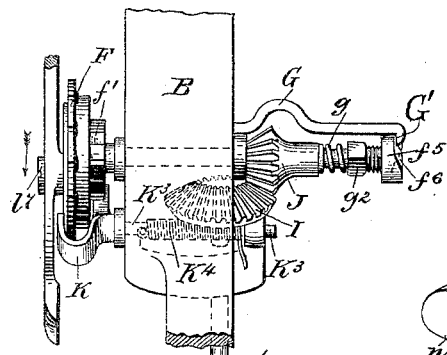
Figure 5:
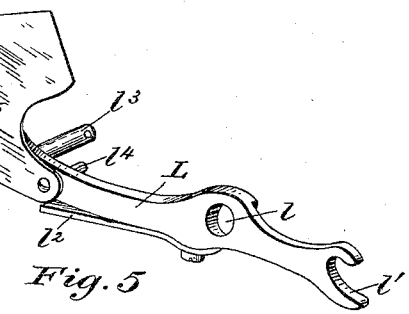
Figure 6:
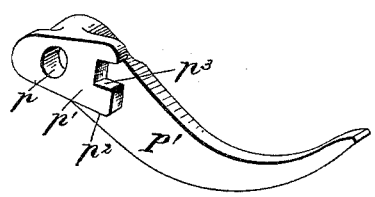
Figure 7:
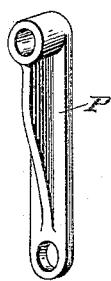
Figure 8:
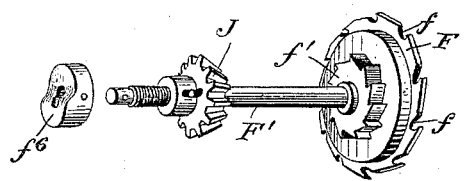
Figure 9:
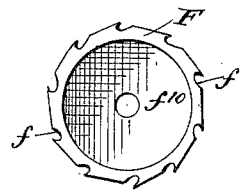

Referring to the accompanying drawings, in which similar letters of reference indicate like parts, Figure 1 is a perspective view of a machine embodying my invention, the hopper not being shown. Fig. 2 is an elevation of the picking mechanism, showing the position of the parts when the straw-carrier is about to deliver the straw from the yielding device, against which it has been forced by the picker and in which it is held, to the twister. Fig. 3 is also an elevation of the picking mechanism, showing the position of the parts after the straw-carrier has delivered the band material to the twister. Fig. 4 is a side elevation of the picking mechanism, showing the driving-gear and a cam for releasing the friction-connection between the frictionally-revolved picker-disk and its driving-disk. Fig. 4ᵃ is a vertical longitudinal section of the picker-driving mechanism. Fig. 5 is a perspective view of the straw-carrier detached; Fig. 6, a perspective view of a pawl for revolving the picker-disk in the reverse direction from that indicated by the arrow in Fig. 2 to release the straw, so that it may be carried to the twister by the straw-carrier. Fig. 7 is a perspective of a link to which the straw-carrier is pivoted. Fig. 8 is a perspective view of the inner side of the picker-disk, the picker-operating shaft on which the picker-disk is mounted, and the cam secured to the picker-operating shaft. Fig. 9 is a side elevation of the picker-disk.

Figure 10:
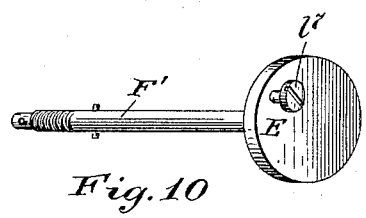
Figure 11:
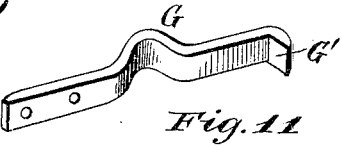
Figure 12:
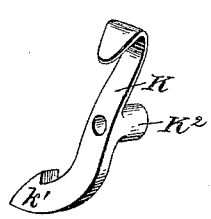
Figure 13:
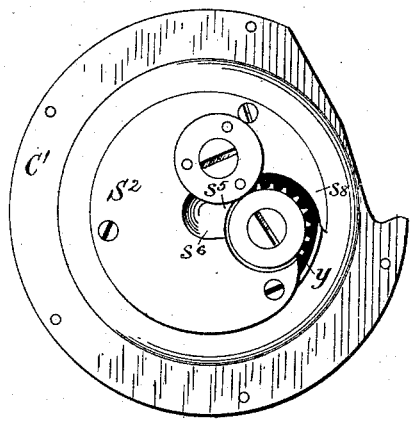
Figure 14:
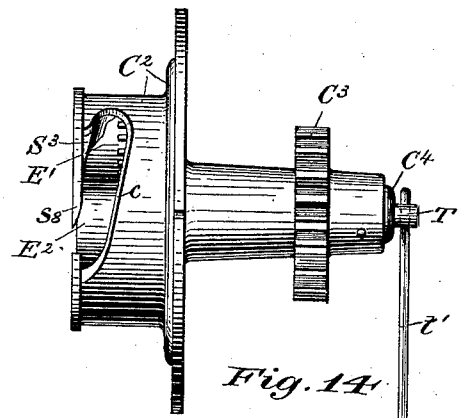
Figure 15:
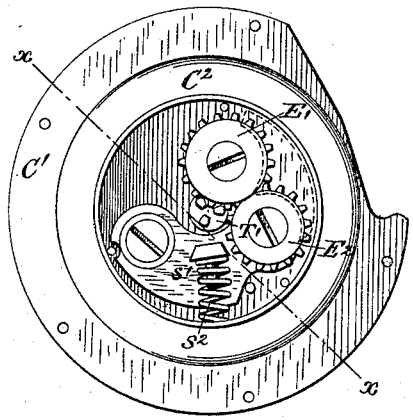
Figure 16:
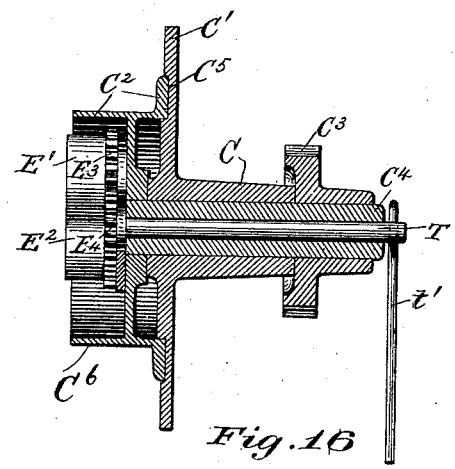
Figure 17:
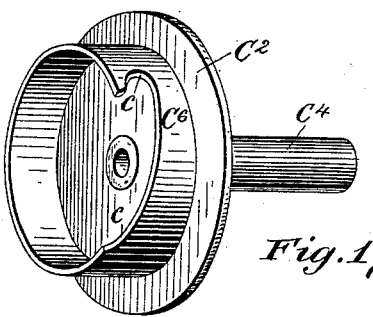
Figure 32:
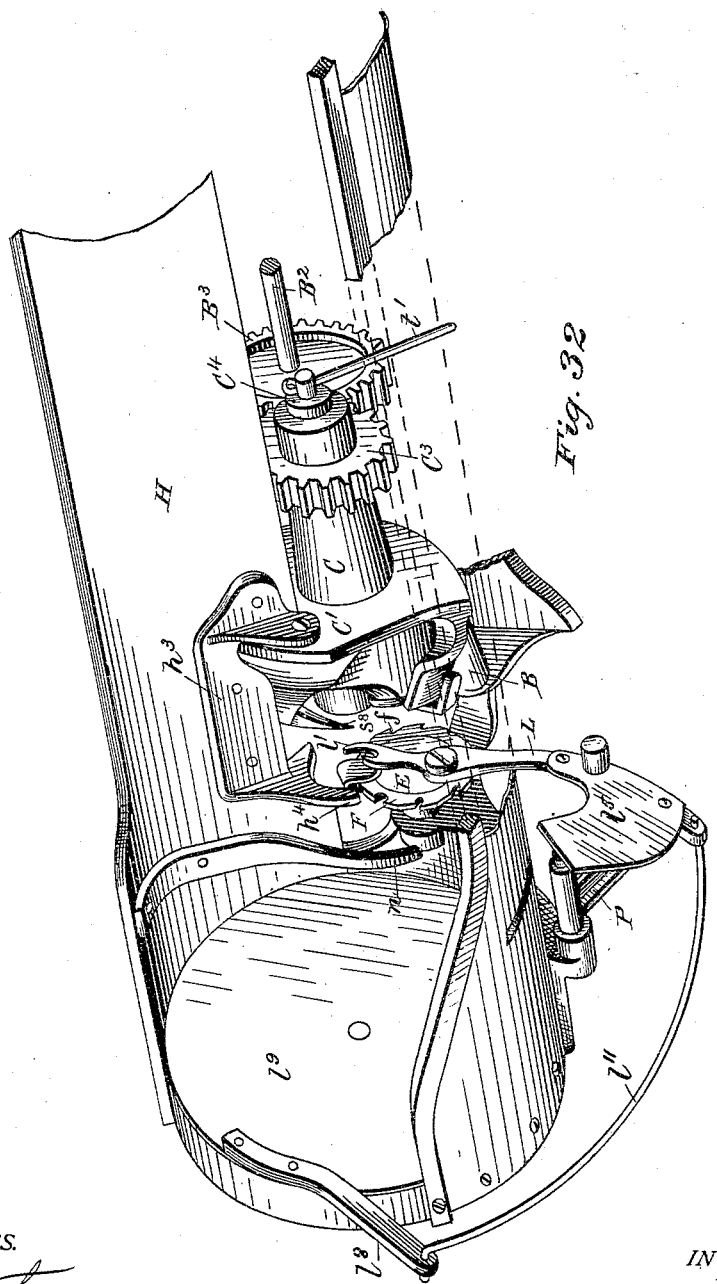

Fig. 10 is a perspective view of the picker-operating shaft and a disk secured thereto. Fig. 11 is a perspective view of an arm attached to the frame of the twister, against which arm the cam shown in Fig. 8 works. Fig. 12 is a perspective view of the yielding arm detached. Fig. 13 is an end elevation of the twister. Fig. 14 is a side elevation of the same. Fig. 15 is an inner elevation of the twister with the outer cap or disk (shown in perspective in Fig. 19) removed. Fig. 16 is a longitudinal cross-section through line $x\,x$, Fig. 15. Fig. 17 is a perspective of the twister-disk and its shaft. Fig. 18 is a perspective of part of the cover for the twisting mechanism. Fig. 19 is a perspective view of a disk or plate which is secured to the twister-drum, and which shields or covers the planetary-moving rollers carried on the latter. The disk or plate is indented or hooked in order to receive the band material from the straw-carrier, and is provided also with openings through which the ends of the planetary-moving rollers project. Fig. 20 is a perspective of a piece forming peripheral bearings for the twister-rollers; Fig. 21, a perspective of one of the twister-rollers; Fig. 22, a perspective showing the yielding bearing for one of the twister-rollers; Fig. 23, a perspective of one of the corrugated rollers for withdrawing the band formed from the twister; Fig. 24, a view of part of the frame detached; Fig. 25, an elevation of a clutch mechanism by which the action of the twister is controlled; Fig. 26, a perspective view of an internal shaft of the twister for driving the twister-rollers. Fig. 27 is a view in perspective of the hopper. Figs. 28, 30, and 31 are details of the hopper. Fig. 29 is a sectional perspective view. Fig. 32 is a perspective view of the picking mechanism and twister. Fig. 33 is a view of a corrugated washer secured to one of the planetary-moving twister-rollers. Fig. 34 is a perspective of part of the twister.

A is the standard of the twister, and is secured on the harvester so that the pinion $b$, loosely mounted on the shaft $B^2$, will receive motion from some moving part of the harvester.

B is the frame of the twister. The shaft $B^2$ revolves in bearings in the frame B, and the casting $B'$ is also formed with a bearing to support one end of the shaft $B^2$. The pinion $b$ is provided with a clutch-face $b^2$, and when the spring $b'$, surrounding the shaft $B^2$ and interposed between the casting $B'$ and the pinion $b$, is allowed to act it will force the clutch $b^2$ into engagement with the clutch $b^3$, secured to shaft $B^2$, which will then revolve with pinion $b$, and motion will be communicated through the gear $B^3$, fast on shaft $B^2$ and meshing with the smaller gear $C^3$, to the twisting apparatus, and through the pinion $B^4$, also secured to shaft $B^2$ and meshing with the bevel-gear $B^5$, secured to the shaft $b^6$, to the rollers $b^7$ and $b^8$, and also to the picking mechanism through the bevel-gears I J, secured, respectively, to the shaft $b^6$ and to the picker-operating shaft F'.

$b^4$ is a shipper for throwing the clutch $b^2\,b^3$ into and out of engagement. The pinion $b$ is provided with a cam-face, which is acted upon by the shipper $b^4$ to cause the disengagement of the clutches $b^2\,b^3$. The shipper $b^4$ is suitably connected with devices actuated by the supply of the band from the twister to automatically start and stop the latter. This forms no part of the present invention, and is only so far herein described as is necessary to show the manner of communicating motion to the twister.

The upper portion D of the frame B is curvilinear in form, and in the holes $d'$ is bolted the hopper in which the band material is placed. The straws to form the band are cut of a uniform length and placed in the hopper, in the bottom of which there is a longitudinal slot. The picker-shaft F' is mounted in a bearing formed therefor in the upper portion of the frame B. The end of the pinion J, by which the shaft F' is driven, bears against the frame B, and the pinion J is secured to the shaft F' by a pin passing through a hole in the shaft and a somewhat elongated hole in the pinion J. (See Fig. 8.) The shaft F' is screw-threaded, and is provided with a nut $g^2$, between which and the pinion J is interposed a spiral spring $g$, Fig. 4.

Securely pinned to the end of the shaft F' is the cam-collar $f^5$, having the cam $f^6$ on its outer face. The outer end of the shaft F' is formed or provided with the disk E, which fits in the recess $f^{10}$ in the picker-disk F, Figs. 9 and 10. The shaft F' passes through the central hole in the picker-disk, which is loosely mounted on the shaft F'. The picker-disk is confined on its shaft between the disk E and that portion of the frame-work in which the shaft F' is journaled. Between the disk E and the disk F is interposed a leather or rawhide washer, in order that the spring $g$, when allowed to act, may cause disk F to revolve with disk E. The arm G is securely bolted to the frame B, and its downward projection G' is in the path of the cam $f^6$. It is evident from the foregoing that as the shaft F' is revolved the spring $g$ will force the disk E against the friction-washer interposed between the disks E and F, and that the disk F will, on account of such friction, revolve with the disk E, the shaft F' being allowed a limited longitudinal movement by the slot in the pinion J, and it will also be evident that as the cam $f^6$ comes in contact with the arm G' that the shaft F' will be forced away from the arm G' against the action of the spring $g$, and consequently the disk E, secured to shaft F', will be moved away from the disk F, which will cease to revolve with the shaft F' and be free to be turned in an opposite direction from that of the movement of the shaft. The picker-disk F is formed with the peripheral notches $f$ and on its inner face with the ratchet-teeth $f'$. The disk is normally caused to revolve in the direction indicated by the arrow in Figs. 2 and 3, and is placed so that it projects upwardly through the slot in the bottom of the hopper, to the length of which it is transverse. The straws to form the band material rest upon the disk F, and as the latter is revolved a straw is seized by one of the notches in the disk. The hopper is somewhat inclined, and the disk F is placed at or near its lower end. The peripheral notches in the disk are preferably of a size to seize and carry forward one straw at a time. The straws also rest upon the arm $n$ in the hopper, and this arm passes across the inner upper portion of the face of the disk F in close proximity thereto, there being a quarter of an inch, more or less, between the disk and the arm $n$. As the straw is carried out of the hopper by the notch in the disk F its end is bent by the disk against the arm $n$, and should more than one straw be caught in any notch in disk F the size of the notch in the disk would prevent a sufficient grasp to bend more than one straw, and consequently all but the one straw would be thereby forced from the notch in the disk F. Of course the amount of straw or the number of straws to be at one time withdrawn from the hopper will depend upon the size of the notches in the disk. This bending the ends of the straws as they are being withdrawn from the hopper also answers another purpose, to be hereinafter described. The end of the straw bent by the disk F against the arm $n$ is of course the lower end, and projects about one-half inch (more or less) beyond the disk F toward the cam-collar $f^5$. Of course it will be understood that the arm $n$ should not be placed close enough to the disk F so that the straws will be broken off.

K is a yielding arm provided with the hub $K^2$, which passes over and is secured to the shaft $K^3$, rocking in bearings in the frame B. (See Fig. 1.) The upper end of the arm K is hook-shaped and passes over the periphery of the picker-disk. The lower end is made in the form of a dog $K'$, which is at the proper time, by the action of the straw carried by the disk F, brought into engagement with the ratchet-plate $f'$ to stop the revolution forwardly of the picker-disk F. A spiral spring $K^4$ is coiled around the shaft $K^3$, and one end of the spring is secured to the shaft and the other to the frame B, and the tendency of the spring is to keep the dog $K'$ free from engagement with the ratchet-teeth $f'$. As soon, however, as a straw has been carried by the notched picker-disk against the yielding arm K the force exerted thereby will overcome the action of the spring $K^4$, and the dog $K'$ will engage with the teeth $f'$, and consequently will cause the disk F to cease its revolution in the direction indicated by the arrow, Figs. 2 and 3, and the picker-disk will not again revolve in this direction until the dog $K'$ is released. There are ten notches in the periphery of the picker-disk, and the cam $f^6$ (see Fig. 8) is so formed that the friction exerted upon the disk F will not be sufficiently released to cause the disk F to cease to revolve until it has made somewhat more than one half-revolution, so that there will be six or more opportunities for the disk to catch a straw and carry it from the hopper, and, on the other hand, should the first notch in the forward revolution of the disk catch a straw and carry it against the arm K the picker-disk will stop its forward revolution until such straw has been carried into the twister in the manner hereinafter described.

L is the straw-carrier. It is forked at $l'$ at its forward end, (see Fig. 5,) and is provided with a hole $l$, passing over the crank-pin $l^7$, secured in the disk E, the pin $l^7$ of course turning in the hole $l$. The link P is pivoted at its upper end to the frame B, and is pivoted at its lower end on the stud $l^3$, secured to the straw-carrier L. A flat leaf-spring $l^2$ is bolted to the under side of the straw-carrier L, and a dog $P'$, having in its rear end the hole $p$, is pivoted on the stud $l^3$. The dog $P'$ is formed with the projection $p'$, the under side of which $p^2$ rests on the rear end of the spring $l^2$. There is a notch $p^3$ in the projection $p'$, which passes over the screw $l^4$ in the straw-carrier L. (See Fig. 5.) The rear end of the straw carrier L is formed with a hole $l^6$, in which is pivoted a link $l^{11}$, pivoted to the arm $l^8$, which is secured to the disk $l^9$, rocking or reciprocating upon the pin $l^{10}$, secured in the lower end piece of the hopper H. A sheet-iron wing $l^5$ is bolted to the straw-carrier L, and as the latter is caused to reciprocate moves up through the slot $h^2$ in the side of the hopper H, the reciprocation of the carrier L' also moving the disk $l^9$ through the pitman $l^{11}$ and arm $l^8$. The purpose of the wing $l^5$ and the reciprocating disk $l^9$ is to agitate the straws $h'$ in the hopper, so that the picker-disk may always be in contact with them. As the carrier L reciprocates it carries with it the dog $P'$, which, as the forked forward end $l'$ of the carrier is moving by the yielding arm K, (see Fig. 2,) comes in contact with the ratchet-teeth $f'$ on the inner face of the disk F on the side of the rack opposite that with which the dog $K'$ of the trip-arm K is engaged. The forked end $l'$ of the carrier takes the straw from the yielding arm, where it has been placed and is held by the disk F, and carries it forward to the twister. The purpose of supporting the dog $P'$ by the spring $l^2$ is to avoid wear of the rack $f'$, and should the dog strike against the end of one of the teeth in the rack $f'$ to allow the dog to yield, in order that the parts may not be broken, the notch $p^3$ permitting the dog $P'$ a limited movement. As the carrier L is about to remove the straw from the trip-arm K, the dog $P'$ revolves the disk F in the reverse direction from that indicated by the arrow, Figs. 2 and 3, and in order that the picker-disk F may be easily revolved in such direction the cam $f^6$, at this time bearing against the arm G, releases the friction exerted upon the disk by the spring $g$. As the carrier L is about to take the straw forward into the twister, the hold of the disk F thereon, pressing the straw against the yielding arm K, is released, and the reverse revolution of the disk F, besides releasing the straw, also insures the disengagement of the dog K' from the rack $f'$, and the forward revolution of the disk E releasing the dog P' the various parts are again brought into position for the succeeding picking and delivering operation. The bend in each straw made by the picker-disk F in carrying it against the arm $n$ insures its not slipping from the fork $l'$ as the straw is being carried forward to the twister, and in order to render this still more certain the casting $h^3$ is bolted to the hopper and has the wing $h^4$, extending downwardly toward the twister. The forward end of the carrier L passes forward to the twister in delivering the straw thereto, in close proximity to the wing $h^4$, against which the bent end of the straw is pressed by the carrier, and the slipping of the straw from the carrier is thus prevented. The ends of the straws only are withdrawn from the hopper by the picker-disk and the straw-carrier, and the twister-drum completes the withdrawal of the straws from the hopper, winding the straw around the drum as the latter is revolved. The arm $n$ is of course somewhat nearer the lower end of the hopper than the picker-disk, and the part $h^4$ is substantially in the same vertical plane as the picker-disk, and the straw-carrier passes in close proximity to the face of the part $h^4$ toward the upper end of the hopper, and the straw is confined under the curved lower part of $h^4$. (See Fig. 27.)

From an inspection of the drawings it will be noticed that the portion or wing $h^4$ extends over the picker-disk, and its function is to prevent the picker-disk from carrying too great a quantity of the band material from the hopper. Should more than the requisite amount of band material be carried forward, either by reason of the straws having become crossed or tangled or for any other cause, the arm $h^4$, projecting, as before noted, over the periphery of the picker-disk, would stop the advance of the surplus of the band material, allowing only that held by the notch in the disk to be carried out of the hopper.

The twisting apparatus is substantially similar to that described in my aforesaid patent, but presents certain improvements thereon.

C' (see Fig. 1) is a stationary disk bolted to the frame B, and is formed with the elongated hub C, which is made hollow and serves as a bearing for the hollow spindle $C^4$ of the twister disk or drum $C^2$. (See Figs. 14, 16, and 17.) The pinion $C^3$ is secured to the spindle $C^4$ of the twister-disk, and, meshing with the gear-wheel $B^3$, causes the disk $C^2$ to revolve therewith. The disk C' is annularly grooved at $C^5$, and the disk $C^2$ is formed with a circular shoulder, which takes into the annular groove, straws being thus prevented from getting wedged between the revolving disk $C^2$ and the stationary disk C'. The twister-disk is furthermore provided with the projecting flange $C^6$, cut away at $c$, which serves as a drum upon which the band material is wound and from which it is drawn through the twister.

Eccentrically to the face of the disk $C^2$ are secured the two twister-rollers E' $E^2$, one of which is preferably made of rubber and the other of steel. The rollers are mounted upon studs secured in the disk and are secured to the intermeshing pinions $E^3$ $E^4$. The shaft T passes through the hollow spindle of the disk $C^2$, and is formed or provided with the disk T', having the cog-teeth $t$. A wire rod $t'$ passes through a hole $t^2$ in the outer end of the shaft T, and, abutting against the shaft $B^2$, prevents the revolution of the shaft T with disk $C^2$. The disk T' occupies such a position with reference to the pinion $E^3$ that as the disk $C^2$ revolves, the teeth of pinion $E^3$ meshing with the stationary cog-teeth $t$, the pinion $E^3$ is caused to revolve on its stud in the disk $C^2$, and, meshing with the pinion $E^4$, drives that, and consequently the rollers E' $E^2$, secured to them, have a planetary movement imparted to them through the stationary cog-teeth $t$ and the revolution of the disk $C^2$. It is advisable that the band material should be drawn through between yielding surfaces, and, as the rubber roller is frequently not sufficiently elastic to accommodate a bunch in the band being twisted, I mount the roller $E^2$ upon a stud secured to the casting S, (see Fig. 22,) and this casting S is pivoted to the disk $C^2$ by a pin passing through the hole $s$ in the casting and secured in the disk. The casting S is further provided with a projecting pintle $s'$, over the end of which is passed a spiral spring $s^2$, the other end of the spring abutting against the inner periphery of the drum of the disk $C^2$. By this construction the roller $E^2$ is allowed to yield bodily away from the roller E', the spring $s^2$ keeping the rollers E' $E^2$ normally in contact.

$S^3$ is a shield bolted to the disk $C^2$, so as to cover partly the peripheries of the rollers E' $E^2$, and its purpose is to prevent straws from being drawn in between the pinions $E^3$ $E^4$. (See dotted lines, Fig. 15.)

$S^2$ is a disk cut away at $s^2$ $s^3$ for the ends of the rollers E' $E^2$, and having the holes $s^4$, by which it is secured to the disk $C^2$. The point $s^5$ projects in between the rollers E' $E^2$, and the portion $s^6$ is depressed below the face $s^7$, and is beveled, so as to guide the straws drawn through the rollers outwardly. The hooked end $s^8$ passes over the cut-away portion of the periphery of the drum on the disk $C^2$ and seizes the straws brought to the twister by the carrier. The guide S' is bolted to the twister-frame B, and its face is adjacent to that of the disk $S^2$. (See Fig. 29.) It is provided with the nose-piece $S^4$, through which the band is drawn out between the corrugated rollers $b^7$ $b^8$. A corrugated washer Z is secured to the end of one of the twister-rollers E' E², and as the end of the straw is pulled into the twister by the hooked end of the disk S², and as the corrugated washer revolves with the roller, the end of the straw held between the corrugated washer and the face of the guide adjacent to the disk S² is forced in between the rollers E' E²; otherwise the straw might be wound around the drum of the disk C² and not be drawn in between the rollers E' E². The bearing for the shaft of the upper corrugated roller $b^8$ in the casting A', attached to the frame B, is sufficiently large, so that the roller has a limited up-and-down movement. A spiral spring $a^3$ is interposed between the shaft and the screw $a'$, screwed into the hole $a^2$, and keeps the rollers $b^7$ $b^8$ normally in contact, or nearly so, and yet permits the upper roller to yield to any desired extent to accommodate a knot in the band. The wire $x$ is stretched across the opening in the hopper to support the upper ends of the band material.

$x'$ is a spring-rod secured to the hopper and projecting over the top of the same to hold the straws or other band material therein.

The operation of the machine is as follows: The straw or other band material is placed in the hopper, and the picker-disk seizes a straw and carries it against the yielding arm K, and the pressure exerted by the straw moves the lower end of the arm K upwardly, so that the dog engages with the rack-teeth $f'$ and the forward revolution of the picker-disk ceases. The straw-carrier is then moved upwardly to seize the straw held against the yielding arm K, and at this time the dog, coming in contact with the rack-teeth $f'$, revolves the picker-disk in the reverse direction, thereby releasing the straw, so that the carrier may carry it forward to the twister-disk, which is so timed that the opening $y$ (see Fig. 13) is brought up to the straw-carrier to seize the straw therefrom, and the straw is drawn in between the planetary-moving rollers E' E² and is wound around the drum on the disk C² by the revolution of the disk. The straws are gradually drawn through between the rollers E' E² and are guided outwardly between the rollers $b^7 b^8$, by which they are held, and the revolution of the disk C² twists them into rope form. At the time the picker-disk is revolving backwardly the friction exerted thereupon by the spring 9 is released through the cam $f^6$, and as soon as the straw has been delivered to the twister the spring again acts, and the picker-disk is caused to again revolve in a forward direction until a straw has been seized from the hopper and forced against the yielding arm K, which stops the action of the disk, as before stated. The spring of course returns the arm K after having stopped the action of the disk, and having been released by the backward revolution thereof, to its normal position.

Having now fully described my invention, what I claim as new, and desire to secure by Letters Patent, is—

1. In a band-twister, the combination, with the picking mechanism and a twisting mechanism, of a yielding arm interposed between the picking and twisting mechanisms in the path of the straw carried forward by the picker to stop the feeding of the band material to the twister by the picker, substantially as and for the purpose specified.

2. The combination, with the hopper containing the band material, of the peripherally-notched picker-disk adapted to withdraw the end of the straw or other band material from the hopper, and an arm fastened to the machine in the path of the movement of the straw and adjacent to the face of the picker-disk, whereby the end of the straw held in the notch in the picker-disk is bent against the arm, substantially as and for the purpose specified.

3. In a band-twister, the combination, with the hopper and a picker adapted to withdraw the band material therefrom, of a yielding arm against which the band material is forced by the picker, and intermediate mechanism between the picker and the yielding arm, whereby the yielding of the arm caused by the pressure of the band material against it stops the picking mechanism, substantially as and for the purpose specified.

4. In a band-twister, the combination, with the peripherally-notched picker-disk, of a yielding arm against which the straw is forced by the picker, and intermediate mechanism interposed between the yielding arm and the picker-disk, whereby when the desired quantity of band material has been carried against the yielding arm by the picker the arm is caused to yield and stop the picker, substantially as and for the purpose described.

5. The combination of a picking device, a yielding arm against which the band material is carried by the picking device, intermediate mechanism interposed between the said arm and the picking device, whereby the yielding of the arm caused by the force exerted upon it by the band material carried by the picker is caused to stop the action of the picker, a twisting device, and a carrier to deliver the band material from the yielding arm to the twister, substantially as and for the purpose specified.

6. The combination, in a band-twister, of a revolving peripherally-notched picker-disk loosely mounted on its shaft, a fixed disk on the shaft, and a spring applied to force the fixed disk against the picker-disk, whereby the picker-disk is caused to revolve with its shaft, a yielding arm against which the band material is forced by the picker-disk, a rack on the picker-disk, and a dog on the yielding arm adapted to engage with the rack on the picker-disk by the yielding of the arm to stop the forward revolution of the picker-disk, substantially as and for the purpose specified.

7. The combination, with the twisting mechanism, of the intermittently-operated peripherally-notched picker-disk and the carrier eccentrically mounted with respect to the picker-disk and adapted to carry the band material withdrawn from the hopper by the picker-disk forwardly to the twister, substantially as and for the purpose specified.

8. The combination of the peripherally-notched picker-disk loosely mounted on its shaft, a disk secured to the shaft and forced against the picker-disk by a spring, whereby the picker-disk is caused to revolve with its shaft, a yielding arm pivoted in the path of the band material withdrawn from the hopper by the picker-disk, a rack formed on the picker-disk, and a dog formed on the yielding arm adapted to engage by the yielding of the arm through the force exerted thereupon by the band material delivered against it with the rack on the picker-disk to stop the revolution thereof, a carrier eccentrically mounted with respect to the picker-disk, and a dog secured to the carrier to engage with the rack on the picker-disk to revolve the picker-disk backwardly, substantially as and for the purpose specified.

9. The combination of the peripherally-notched picker-disk loosely mounted on its shaft, a disk secured to the shaft, and a spring applied to force the disks together, whereby the picker-disk is caused to revolve with its shaft through the friction caused by the spring, a rack formed on the picker-disk, a dog adapted to engage the rack to revolve the picker-disk backwardly, and a cam on the shaft of the picker-disk bearing against some fixed portion of the machine to release the friction between the disks during the backward revolution of the picker-disk, substantially as and for the purpose specified.

10. The combination, with the peripherally-notched picker-disk adapted to carry the straws to form the band one at a time from the hopper, of a yielding arm against which the straw is carried, intermediate mechanism interposed between the yielding arm and the picker, whereby the yielding of the arm caused by the straw carried against it by the picker-disk stops the revolution of the latter, and the straw-carrier forked at its forward end and eccentrically mounted with respect to the picker-disk and pivoted at its rear end to the machine, substantially as and for the purpose specified.

11. The combination, with the frictionally-revolved peripherally-notched reciprocating picker-disk and a rack formed thereon, of an arm pivoted on the machine in the path of the band material withdrawn from the hopper by the picker-disk a spring secured to the arm and to the machine, and the dog formed on the lower end of the arm, whereby the straw or band material carried against the arm by the picker-disk overcomes the action of the spring and causes the dog to engage the rack to stop the operation of the picker-disk, substantially as and for the purpose specified.

12. In a band-twister, the combination, with a hopper formed with an opening in its side, of the twisting mechanism, a picker upon which the band material in the hopper rests, a carrier to deliver the band material withdrawn from the hopper by the picker to the twister, and an agitator secured to the carrier and moved against the band material in the hopper by the carrier, substantially as and for the purpose specified.

13. The combination, with the carrier adapted to deliver the band material withdrawn from the hopper by the picker-disk to the twister, of a wing secured to the machine adjacent to the path of the carrier, whereby the band material in being carried forward to the twister is held against the wing, substantially as and for the purpose specified.

14. The combination, with the peripherally-notched picker-disk and the yielding arm against which the band material is carried to stop the forward revolution of the picker-disk, of the reciprocating carrier adapted to carry the band material to the twister from the yielding arm, the yielding dog mounted on the carrier, and the rack formed on the picker-disk, substantially as and for the purpose specified.

15. The combination, with the planetary-moving twister-rollers, one of which is provided with a corrugated end, of a plate secured to the twister-frames adjacent to the corrugated end of the twister-roller, substantially as and for the purpose specified.

16. The combination, with the planetary-moving twister-rollers, of the shield $S^3$, substantially as and for the purpose specified.

17. The combination, with the twisting device, of a picker-disk formed with peripheral notches and adapted to withdraw one end of the straw to form the band from the hopper containing the band material, of a vibrating carrier intermediate between the picker-disk and the twister and adapted to carry the band from the former to the latter, substantially as and for the purpose specified.

18. The combination of the continuously-operating twister, the continuously-operated band or straw carrier, and the intermittently-operated picking mechanism, substantially as and for the purpose specified.

19. The combination of the picker-disk, the vibrating straw-carrier, a rack on the picker-disk, and a dog on the straw-carrier to engage the rack on the picker-disk, substantially as and for the purpose specified.

20. The combination of the picker-disk loosely mounted on its shaft, a fixed disk on the shaft, the longitudinally-sliding spring-pressed picker-disk shaft, and a cam thereon bearing against some fixed portion of the machine to overcome the tension of the spring, substantially as and for the purpose specified.

21. The combination, with a peripherally-notched picker-disk and the hopper containing band material, of an arm secured to the machine over the periphery of the picker-disk to arrest the advance of the surplus band material moved forward by the picker-disk.

22. The combination, with a hopper, of a disk pivoted thereto at one end, upon which disk the band material rests, the picking device, and means to agitate the disk, as and for the purpose specified.

In witness whereof I have hereunto set my hand this 9th day of May, 1888.

GEORGE HUTCHINS HOWE.

Witnesses:
    HUGH POMEROY BLACKINTON,
    GEO. H. NICHOLLS, Jr.